G. R. CLEMENTS.
Harvester Dropper.

No. 83,040.

Patented Oct. 13, 1868.

Witnesses
W. C. Ashkettle
Wm. A. Morgan.

Inventor
G. R. Clements
per Munn & Co.
Attorneys.

UNITED STATES PATENT OFFICE.

GEORGE R. CLEMENTS, OF PRESCOTT, WISCONSIN.

IMPROVEMENT IN DROPPERS FOR HARVESTERS.

Specification forming part of Letters Patent No. 83,040, dated October 13, 1868.

*To all whom it may concern:*

Be it known that I, GEORGE R. CLEMENTS, of Prescott, in the county of Pierce and State of Wisconsin, have invented a new and Improved Dropper for Reapers; and I do hereby declare that the following is a full, clear, and exact description thereof, which will enable those skilled in the art to make and use the same, reference being had to the accompanying drawings, forming part of this specification.

This invention relates to a new and improved dropper for reapers; and it consists of a peculiar arrangement of a grain-discharging platform and cut-off, as hereinafter fully shown and described, whereby the cut grain may be discharged in gavels from the machine at the will of the driver, and by a very simple manipulation.

Figure 1:
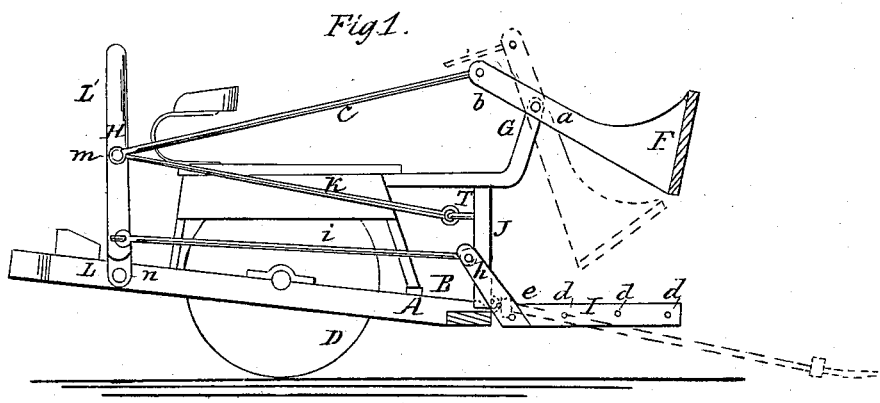
Figure 2:
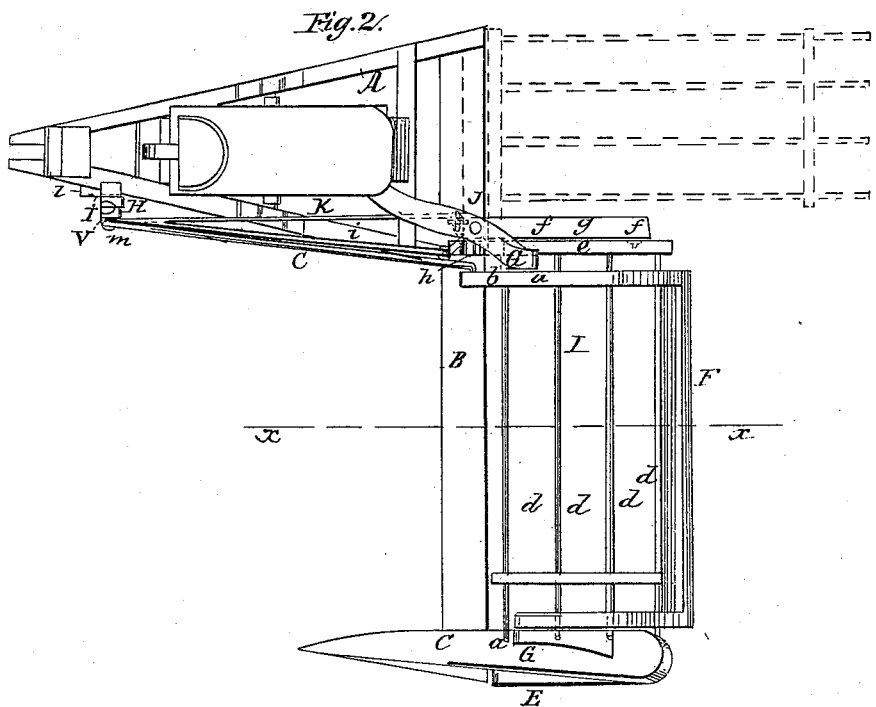

In the accompanying sheet of drawings, Figure 1 is a side sectional view of my invention, taken in the line $x\,x$, Fig. 2; Fig. 2, a plan or top view of the same.

Similar letters of reference indicate corresponding parts.

A represents the main frame of a harvester; B, the finger-bar, projecting at right angles therefrom; and C, the divider at the left-hand or grain end of the cutter-bar. D is a main wheel, placed within the main frame A; and E, a wheel which supports the grain end of the finger-bar.

F represents the cut-off, which receives the cut grain. This cut-off is suspended by pivots $a$ between two uprights, G G, one being on the grain-divider C, and the other attached to the main frame.

The cut-off is directly back of the finger-bar B, and the right-hand end of the cut-off has an arm, $b$, extending upward some distance above the pivot $a$, which passes through said arm, the upper end of the arm $b$ being connected to a lever, H, at the front part of the main frame by a rod, $c$.

By this arrangement the cut-off F may be raised and lowered—that is to say, swung upward and downward on its pivots $a\,a$, as will be understood by reference to Fig. 1.

I represents a slatted dropping-platform, which may be constructed of a series of parallel rods, $d$, fitted at one end in a bar, $e$, which is connected, by hinges or joints $f$, to a bar, $g$, the latter, at its inner end, being framed in a turning upright, J, at the rear part of the main frame.

The bar $e$ has an arm, $h$, projecting upward obliquely from it, and the upper end of this arm is connected, by a rod, $i$, with the lower end of the lever H, and the turning upright J also has an arm, $j$, projecting from it, which is connected by a rod, $k$, with the lever H at the same point with the rod $c$. (See Fig. 1.) This lever H is composed of two parts, $l\,l'$, the latter, $l'$, being pivoted to $l$ at $m$, where the rods $c\,k$ are attached, and the lower end of $l$ is pivoted to the main frame A, as shown at $n$.

When the lever H is shoved forward the grain-discharger I is in contact with the rear side of the finger-bar, and its rods $d$ parallel therewith, as shown clearly in Fig. 2, the platform F being elevated. When the parts are in this position, the cut grain falls upon the discharger I, and when a sufficient quantity of grain has fallen upon I to form a sheaf the driver draws backward the upper end of the lever H, (both parts,) and the discharger is thereby moved outward in line with and at the rear of the main frame A, as shown in Fig. 2, and the platform F simultaneously lowered, as shown. When the discharger I reaches this latter position, its outer end drops, under the weight of the grain upon it, the lower end of the part $l'$ of the lever H being drawn backward, and the stubble will catch the grain at the outer depressed end of the discharger, and the former will be drawn off under the forward movement of the machine.

The platform F catches the grain while the discharger is in an outward position, and when the grain is off from the discharger the driver shoves forward the upper end of the lever H, and the discharger is moved back to the rear of the cutter-bar, and the platform is simultaneously raised or thrown back, the grain upon it being discharged upon the discharger.

In grasping the lever H to move the discharger I from an outward position to that at the rear of the cutter-bar, the outer end of the discharger is raised to a horizontal position in consequence of the part $l'$ being brought in line with the part $l$.

I claim as new and desire to secure by Letters Patent—

The lever H, composed of two parts, $l\ l'$, connected by a pivot, $m$, in combination with the cut-off and grain-discharger, connected to said lever in the manner substantially as and for the purpose specified.

GEORGE R. CLEMENTS.

Witnesses:
P. V. WISE,
W. H. H. CLEMENTS.